United States Patent
Bielawski et al.

(10) Patent No.: US 10,613,816 B2
(45) Date of Patent: Apr. 7, 2020

(54) CONTAINER WITH ELECTRONIC MESSAGING

(71) Applicant: Whirley Industries, Inc., Warren, PA (US)

(72) Inventors: Brad M. Bielawski, Warren, PA (US); Lucanus J. Boger, Warren, PA (US); Ruth A. McClellan, Youngsville, PA (US); Brian K. Reib, Pleasantville, PA (US); Jospeh M. Schwind, Warren, PA (US); Joe Vincent Shulsky, Clear Lake Shores, TX (US)

(73) Assignee: Whirley Industries, Inc., Warren, PA (US)

( * ) Notice: Subject to any disclaimer, the term of this patent is extended or adjusted under 35 U.S.C. 154(b) by 0 days.

(21) Appl. No.: 16/233,754

(22) Filed: Dec. 27, 2018

(65) Prior Publication Data
US 2019/0235819 A1    Aug. 1, 2019

Related U.S. Application Data

(60) Provisional application No. 62/622,506, filed on Jan. 26, 2018, provisional application No. 62/634,376, filed on Feb. 23, 2018.

(51) Int. Cl.
*G09G 3/00* (2006.01)
*G06F 3/147* (2006.01)
*G09G 3/32* (2016.01)
*A47G 19/22* (2006.01)
*G06F 3/14* (2006.01)

(52) U.S. Cl.
CPC ......... *G06F 3/147* (2013.01); *A47G 19/2227* (2013.01); *G06F 3/14* (2013.01); *G09G 3/32* (2013.01); *A47G 2019/2238* (2013.01); *G09G 2330/02* (2013.01); *G09G 2354/00* (2013.01); *G09G 2370/16* (2013.01); *G09G 2380/02* (2013.01)

(58) Field of Classification Search
CPC ........ A47G 19/2227; A47G 2019/2238; G06F 3/14; G06F 3/147; G09G 2330/02; G09G 2354/00; G09G 2370/16; G09G 2380/02; G09G 3/32
USPC ...................................................... 345/690
See application file for complete search history.

(56) References Cited

U.S. PATENT DOCUMENTS

| | | |
|---|---|---|
| 7,383,650 B2 | 6/2008 | Duesler |
| D617,200 S | 6/2010 | Goldburt |
| 7,954,970 B2 | 6/2011 | Goldburt |
| 8,056,273 B2 | 11/2011 | Goldburt |
| 8,123,033 B2 | 2/2012 | Goldburt |
| 8,232,981 B2 | 7/2012 | Sandy |
| 8,989,673 B2 | 3/2015 | Sandy |
| 9,061,797 B2 | 6/2015 | Goldburt |

(Continued)

*Primary Examiner* — Tony O Davis
(74) *Attorney, Agent, or Firm* — Buchanan Ingersoll & Rooney PC

(57) ABSTRACT

Disclosed are various embodiments of a system configured to generate a customized message via a display. Some embodiments can include a computer network allowing multiple users, via different computer devices, to generate different messages to be displayed on the display. In some embodiments, the display can be attached to a beverage container or other container to allow users to personalize the container via the message being displayed by the display.

19 Claims, 13 Drawing Sheets

(56) References Cited

U.S. PATENT DOCUMENTS

| | | |
|---|---|---|
| 9,152,968 B2 | 10/2015 | Goldburt |
| 9,216,844 B2 | 12/2015 | Goldburt |
| 9,376,235 B2 | 6/2016 | Goldburt |
| 9,628,434 B2 | 4/2017 | Laidlaw et al. |
| 2004/0187184 A1 | 9/2004 | Rubin et al. |
| 2006/0167986 A1* | 7/2006 | Trzyna ................ H04L 51/04 |
| | | 709/203 |
| 2011/0050431 A1* | 3/2011 | Hood ............... A47G 19/2227 |
| | | 340/603 |
| 2012/0303458 A1 | 11/2012 | Schuler, Jr. |
| 2013/0316682 A1* | 11/2013 | Vieira ................ H04W 12/08 |
| | | 455/414.1 |
| 2014/0053944 A1* | 2/2014 | Wang ................... B67C 3/007 |
| | | 141/1 |
| 2014/0067554 A1 | 3/2014 | Heppding |
| 2014/0372505 A1* | 12/2014 | Robinson ............. H04L 67/16 |
| | | 709/202 |
| 2015/0221244 A1 | 8/2015 | Miller et al. |
| 2015/0309611 A1 | 10/2015 | Vertegaal et al. |
| 2019/0073179 A1* | 3/2019 | Laidlaw .................. G09G 3/14 |
| 2019/0130503 A1* | 5/2019 | Wang ..................... G06Q 50/12 |
| 2019/0307287 A1* | 10/2019 | Magatti ............. A47J 31/5253 |

* cited by examiner

CONTAINER WITH ELECTRONIC MESSAGING

CROSS-REFERENCE TO RELATED APPLICATIONS

This patent application is related to and claims the benefit of U.S. Provisional Application No. 62/622,506, filed Jan. 26, 2018, and U.S. Provisional Application No. 62/634,376, filed on Feb. 23, 2018, the contents of each is incorporated by reference herein in their entireties.

FIELD OF THE INVENTION

The present invention relates to a display that can be associated with a container or other apparatus, the display being in communication with a computer network to allow modification of the messages generated by the display.

BACKGROUND OF THE INVENTION

Known systems for message displays can be appreciated from U.S. Pat. Nos. 7,383,650, 7,954,970, 8,056,273, 8,123,033, 8,232,981, 8,989,673, 9,061,797, 9,152,968, 9,216,844, 9,376,235, 9,628,434, U.S. Pat. No. D 617,200, U.S. Pat. Publ. No. 2004/0187184, U.S. Pat. Publ. No. 2012/0303458, U.S. Pat. Publ. No. 2014/0067554, U.S. Pat. Publ. No. 2015/0221244, and U.S. Pat. Publ. No. 2015/0309611. Known systems for message displays can be limited in that they generally fail to provide a display in communication with a computer system that allows for efficient yet robust customization of the messages generated by the display.

SUMMARY OF THE INVENTION

Embodiments can include a container. The container can include a shell having a shell inner surface, a shell outer surface, and a shell sidewall conjoined with a shell bottom and a shell open top, the shell forming a shell cavity. The container can include a liner having a liner inner surface, a liner outer surface, and liner sidewall conjoined with a liner bottom and a liner open top, the liner forming a liner cavity. The container can include a display having a display processor, a display memory, a display transceiver, and a screen. The screen can be a substrate with a plurality of pixels formed therein or thereon. The container can include a power source configured to provide electrical power to the display. In some embodiments, the display can be configured to attach to a portion of the liner. In some embodiments, the liner can be configured to insert into the shell cavity. In some embodiments, the power source can be housed within a power source compartment located within the shell bottom. In some embodiments, the display can be configured to transmit and receive data from at least one computer device. The data can include instructions to be processed by the display processor for controlling the transmission of electrical power from the power source to the plurality of pixels to generate a message. In some embodiments, at least a portion of the shell can be translucent to frequencies of light being emitted from the display. In some embodiments, at least a portion of the liner can be opaque to frequencies of light within the visible spectrum.

In some embodiments, the display can include a GPS unit. In some embodiments, the display can include an internal clock. In some embodiments, the substrate can be a flexible substrate. In some embodiments, the substrate can include a plurality of LEDs formed therein or thereon, each individual LED forming an individual pixel of the plurality of pixels. In some embodiments, the substrate can include a plurality of LEDs formed therein or thereon, wherein multiple LEDs form an individual pixel of the plurality of pixels. In some embodiments, the plurality of pixels can be arranged in a pixel array. In some embodiments, the shell can be translucent to frequencies of light emitted from the plurality of pixels but otherwise opaque to other frequencies of light.

Embodiments can include an electronic messaging system. The electronic messaging system can include a display having a display processor, a display memory, a display transceiver, and a screen. The screen can include a substrate with a plurality of pixels formed therein or thereon. The electronic messaging system can include a first computer device having a first computer device processor, a first computer device memory, and a first computer device transceiver. The electronic messaging system can include a second computer device having a second computer device processor, a second computer device memory, and a second computer device transceiver. In some embodiments, the display, the first computer device, and the second computer device can be in communication with each other via a communication network. In some embodiments, the first computer device can transmit a first messaging scheme to be carried out by the display processor for causing the plurality of pixels to generate a first message. In some embodiments, the second computer device can transmit a second messaging scheme to be carried out by the display processor for causing the plurality of pixels to generate a second message.

Some embodiments can include a plurality of displays, each display of the plurality of displays being in communication with the first computer device and the second computer device via the communication network. Some embodiments can include a plurality of first computer devices, each first computer device of the plurality of first computer devices being in communication with the display and the second computer device via the communication network. Some embodiments can include a plurality of second computer devices, each second computer device of the plurality of second computer devices being in communication with the display and the first computer device via the communication network. Some embodiments can include a plurality of displays, a plurality of first computer devices, and a plurality of second computer devices, each display of the plurality of displays, first computer device of the plurality of first computer devices, and second computer device of the plurality of second computer devices being in communication with each other via the communication network. In some embodiments, the display can be attachable or attached to a beverage container. In some embodiments, at least one of the first computer device and the second computer device can be a smartphone.

Embodiments can include a method of providing an electronic messaging system. The method can involve attaching a display to a beverage container. The method can involve transmitting a first messaging scheme via a first computer device to the display, causing the display to execute the first messaging scheme to generate a first message. The method can involve transmitting a second messaging scheme via a second computer device to the display, causing the display to execute the second messaging scheme to generate a second message. In some embodiments, the execution of the second messaging scheme can be at least partially dependent on the first messaging scheme.

In some embodiments, the method involves the second messaging scheme including a plurality of second messaging schemes, the plurality of second messaging schemes comprising a first-second messaging scheme and a second-second messaging scheme. The first-second messaging scheme can be generated by a first-second computer device and transmitted to the display to generate the second message. The second-second messaging scheme can be generated by a second-second computer device and transmitted to the display to change the second message.

In some embodiments, the method can involve registering the beverage container.

In some embodiments, the method can involve registering the beverage container via a first-second computer device. The second messaging scheme can include a plurality of second messaging schemes, the plurality of second messaging schemes comprising a first-second messaging scheme and a second-second messaging scheme. The first-second messaging scheme can be generated by the first-second computer device and transmitted to the display to generate the second message. The second-second messaging scheme can be generated by a second-second computer device and transmitted to the display to change the second message only when the first-second computer device permits connectivity between the second-second computer device and the display.

In some embodiments, executing the second messaging scheme can involve the first message interrupting the second message. In some embodiments, executing the second messaging scheme can involve the first message being displayed concurrently with the second message. In some embodiments, executing the second messaging scheme can involve preventing the second message from being displayed. In some embodiments, executing the second messaging scheme can involve displaying the first message based on at least one of geographic location of the display and time of day.

In some embodiments, the second messaging scheme includes a plurality of second messaging schemes, the plurality of second messaging schemes comprising a first-second messaging scheme and a second-second messaging scheme. The first-second messaging scheme can be generated by a first-second computer device and transmitted to the display to generate the second message. The second-second messaging scheme can be generated by a second-second computer device and transmitted to the display to change the second message.

In some embodiments, the method can involve registering the beverage container.

In some embodiments, the method can involve registering the beverage container via a first-second computer device, wherein: the second messaging scheme comprises a plurality of second messaging schemes, the plurality of second messaging schemes comprising a first-second messaging scheme and a second-second messaging scheme; the first-second messaging scheme is generated by the first-second computer device and transmitted to the display to generate the second message; and the second-second messaging scheme is generated by a second-second computer device and transmitted to the display to change the second message only when the first-second computer device permits connectivity between the second-second computer device and the display.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
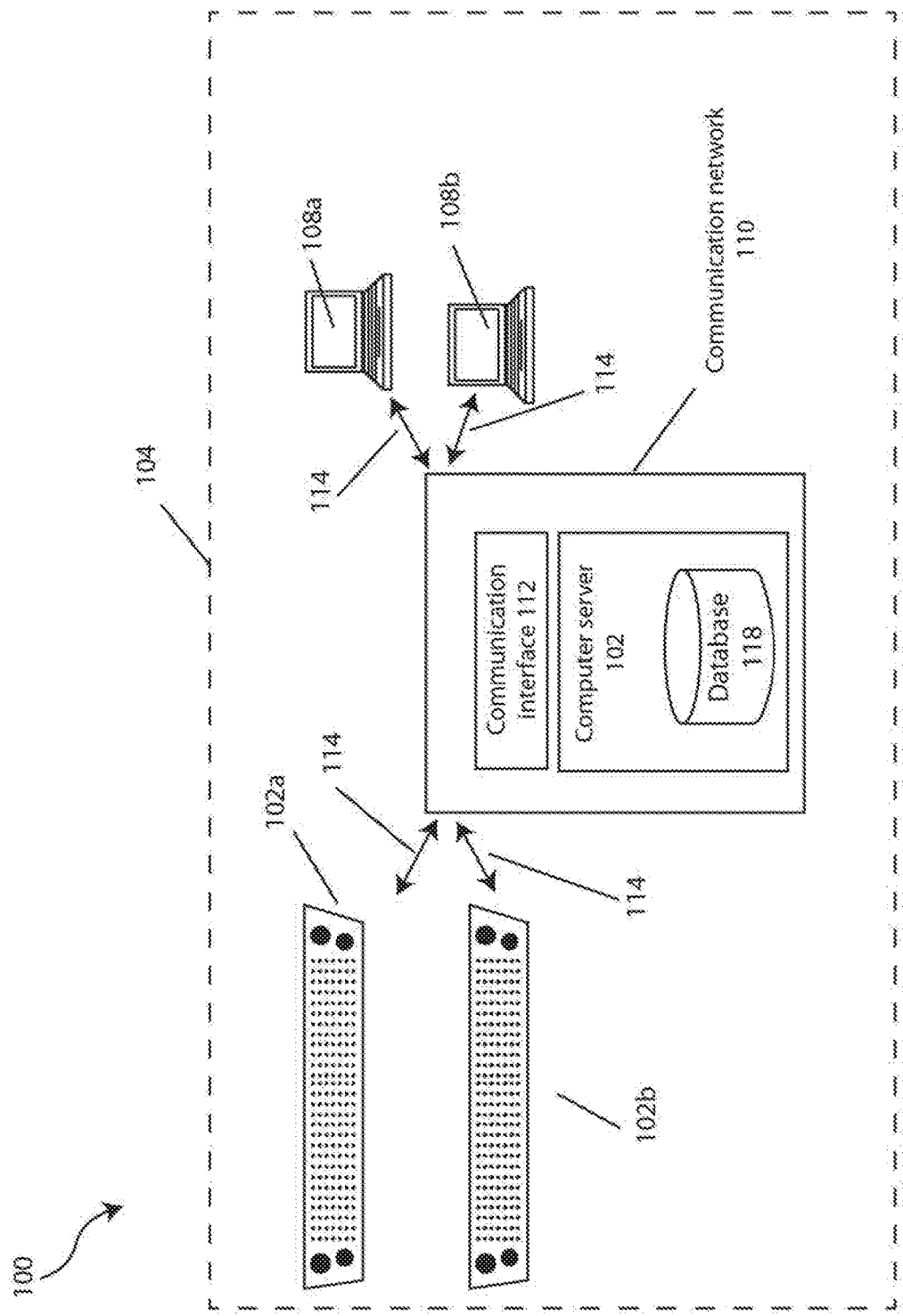
FIG. 1 is shows an embodiment of the system including an exemplary computer network.

Referring to FIG. 1, embodiments can include a system 100 configured to generate a customized message. In some embodiments, the system 100 can include a display 102 in wireless communication with a computer network 104. A component of the computer network 104 can be used to control the display 102. For example, a computer device 108 of the computer network 104 can be used to modify a message displayed by the display 102. Some embodiments of the system 100 can facilitate multiple users controlling the display 102. For example, the display 102 may be attached to, or otherwise associate with, a beverage container 106. A first user (e.g., a merchant selling the beverage container 106) can be connected to the computer network 104, via a computer device 108a, and control some aspects of the display 102 to cause the display 102 to generate a first message. The first message may be an advertisement, for example. A second user (e.g., a buyer of the beverage container 106) can be connected to the computer network 104, via a second computer device 108b, and control some aspects of the display 102 to cause the display 102 to generate a second message. The second message may be a personalized message designed by the second user, for example.

In some embodiments, the system 100 can be set up to provide a hierarchical level of control. This can include generating first message schemes to be executed by the display 102 and second message schemes to be executed by the display 102, the execution of the second message scheme being dependent on the first message scheme. For example, the first user can allow the second user to display the second massage at the discretion of the first user. This can include the first user exercising discretion regarding the content of the second massage, the time when the second message is displayed, allowing the second massage to be displayed without the first message being displayed, allowing the second message to be displayed concurrently with the first message, allowing the second message to be displayed but interrupting the second message at predetermined time periods to display the first message, etc.

Embodiments of the system 100 can include a computer network 104. The computer network 104 can include a computer device 108. The computer device 108 can be configured to store and process data via a processor operatively associated with a non-transitory, non-volatile memory. The display 102 can also be configured to store and process data via a processor operatively associated with a non-transitory, non-volatile memory. The computer device 108 can be in communication with the display 102. Thus, the display 102 can be part of the computer network 104 or be in communication with the computer network 104. The computer device 108 can also include a transceiver operatively associated with its processor. The display 102 can also include a transceiver operatively associated with its processor. The transceivers of the computer device 108 and the display 102 can facilitate wireless transmission of signals and other data between each other.

In some embodiments, the system 100 can include a plurality of displays 102. In some embodiments, the system 100 can include a plurality of computer devices 108. For example, the computer network 104 can include a first computer device 108a, a second computer device 108b, etc. As another example, the system 100 can include a first display 102a, a second display 102b, etc. Each computer device 108 and display 102 can include a processor, a non-transitory, non-volatile memory, and a transceiver to store, process, and wirelessly transmit signals and other data between each component of the system 100.

FIG. 1 shows an exemplary computer network 104 that can be used with the system 100. The computer device 108 may be a processor, a microprocessor, minicomputer, server, mainframe, laptop, personal data assistant, wireless email device, cellular phone, smartphone, pager, fax machine, scanner, or any other programmable device configured to enable transmission and/or reception of data, which may be over a wireless or land network. The computer device 108 may include a peripheral device, such as an input/output device. The peripheral device may include, but is not limited to, a keyboard, a mouse, a screen display, a touch screen, a pen, a monitor, a printer, a hard disk drive, a floppy disk drive, a joystick, an image scanner, etc. Each component of the system 100 can be configured to communicate in whole, or in part, via web-sites through a communication network 110. One or more communication networks 110 may be utilized by the system 100 to promote communication among different components, transfer data, and/or share resource information. Such communication networks 110 may be embodied as, but not limited to, at least one of Ethernet, wireless LAN, MAN, WAN, VPN, SAN, GAN, HomePNA, etc. Other forms of communication networks 110 can include wireless telegraphy via wireless communication networks, such as Wi-Fi, Bluetooth, LTE, wireless protocol, cellular, satellite network, cloud computing network, etc. In some embodiments, a distributed network communication scheme can be used to facilitate connection and communication between each component of the system 100. This can include a being configured as a mesh network topology, a point-to-point network topology, a ring (or peer-to-peer) network topology, a star (point-to-multiple) network topology, or any combination thereof.

The computer network 104 may include a communication interface 112. A communication interface 112 can be configured to allow software and data to be transferred between the components of the system 100. The communication interface 112 can be, but is not limited to, a modem, a network interface (e.g., an Ethernet card), a communications port, a PCMCIA slot and card, etc. Software and data transferred via the communication interface 112 can be in a form of signals, which may be electronic, electromagnetic, optical, or other signals. Signals may travel via a communications path 114, which can be configured to carry signals and may be implemented using wire, cable, fiber optics, a phone line, a cellular phone link, a radio frequency link, etc.

The communication network 110 can include a computer server 116 configured to provide functionality for certain computer programs, modules, or components of the system 100. The computer server 116 can be configured as an application server to provide application programming interfaces (APIs) for specific functions implemented by application software. The computer server 116 can also function as a database server and/or include a storage medium, such as a database 118.

Embodiments of the system 100 can be practiced with various computer system configurations, including multi-core multiprocessor systems, minicomputers, mainframe computers, computers linked or clustered with distributed functions, as well as pervasive or miniature computers that may be embedded into virtually any device.

A processor as discussed herein may be a single processor, a plurality of processors, or combinations thereof. The processor may have one or more processor cores. The processor may be a special purpose or a general purpose processor. The processor can be connected to a communication infrastructure. The communication infrastructure may include, but is not limited to, a bus, message queue, network, multi-core message-passing scheme, etc.

The memories discussed herein can be a computer program medium, a non-transitory computer readable medium, a computer usable medium, etc. These media can include tangible media, such as a removable storage unit and a hard disk installed in a hard disk drive. These media can be means for providing software to the components of the system 100. For example, computer programs and program logic can be stored in a storage medium associated with a processor of the system 100. In addition, or in the alternative, a computer program can be transmitted via the communication interface 112 from one storage medium to another. Such computer programs, when executed by a processor, may enable a component of the system 100 to execute commands and act upon various other components of the system 100.

Wherever a user is referenced in this disclosure, it is understood that this reference includes the associated display(s) 102, computer device(s) 108, computer server(s) 102, database(s) 118, and/or uses thereof. Interactions between users can be implemented using hardware, software, firmware, non-transitory computer readable media having instructions stored thereon, or a combination thereof. Hardware, software, or any combination thereof may embody modules and/or components used to execute functions of the system 100. For example, a module may include software, firmware, hardware, or any reasonable combination thereof. A module can be in the form of application software configured to display information and grant access to data related to certain aspects and functionalities of the system 100. Any of the processors of the system 100 can be programmed to execute computer-readable instructions included within a module.

A module can be programmed to generate a user interface facilitating at least one user to issue commands, access data, and/or transmit data to and from a component of the system 100. Different modules can be programmed to facilitate display and interaction between users and components of the system 100 in different ways. The differentiated displays and interactions of the various modules can be configured to facilitate concerted interaction, filter display of information, and secure containment of sensitive information. Through the various modules, the system 100 can provide a computer network 104 to orchestrate interaction between a user and the various components of the system 100.

Figure 2:
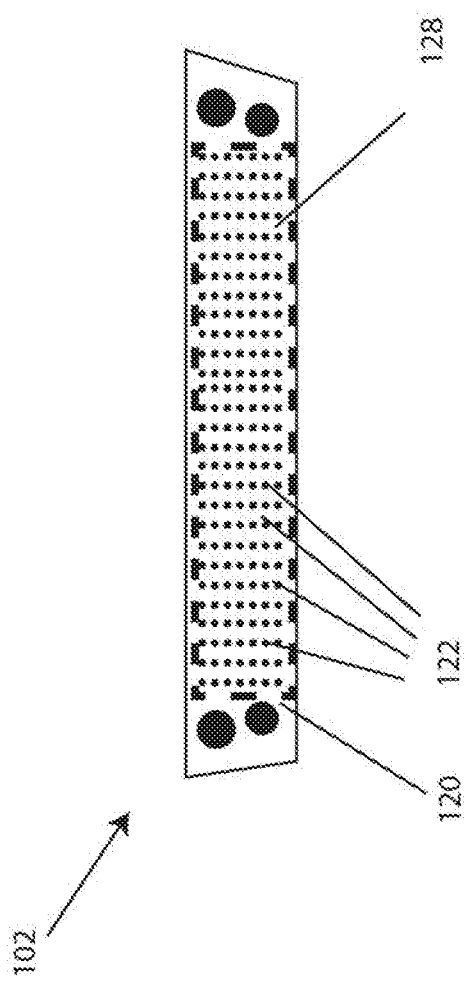
FIG. 2 shows an embodiment of a display that can be used with an embodiment of the system.
Figure 3:
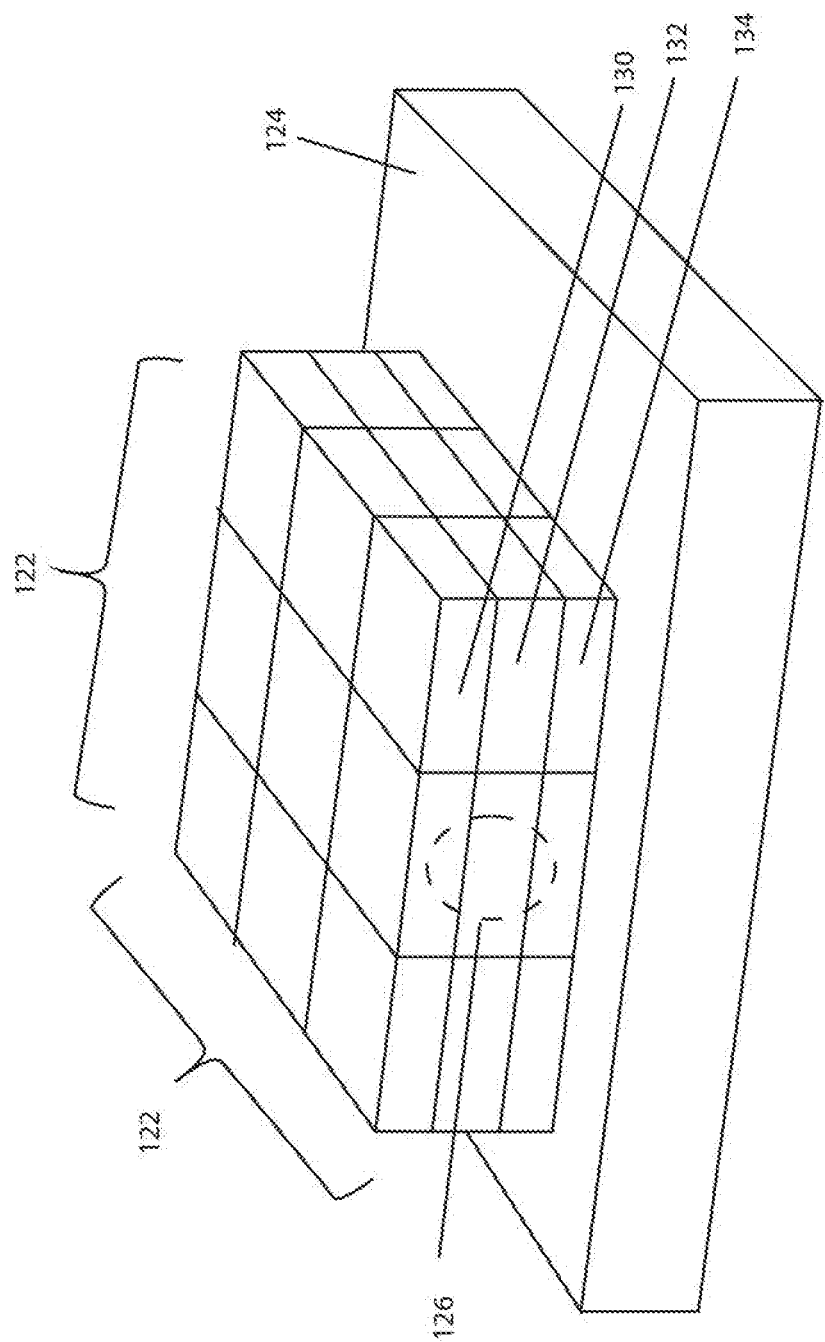
FIG. 3 is a schematic of an embodiment of a screen having a flexible substrate with an array of LEDs forming a pixel.
Figure 4:
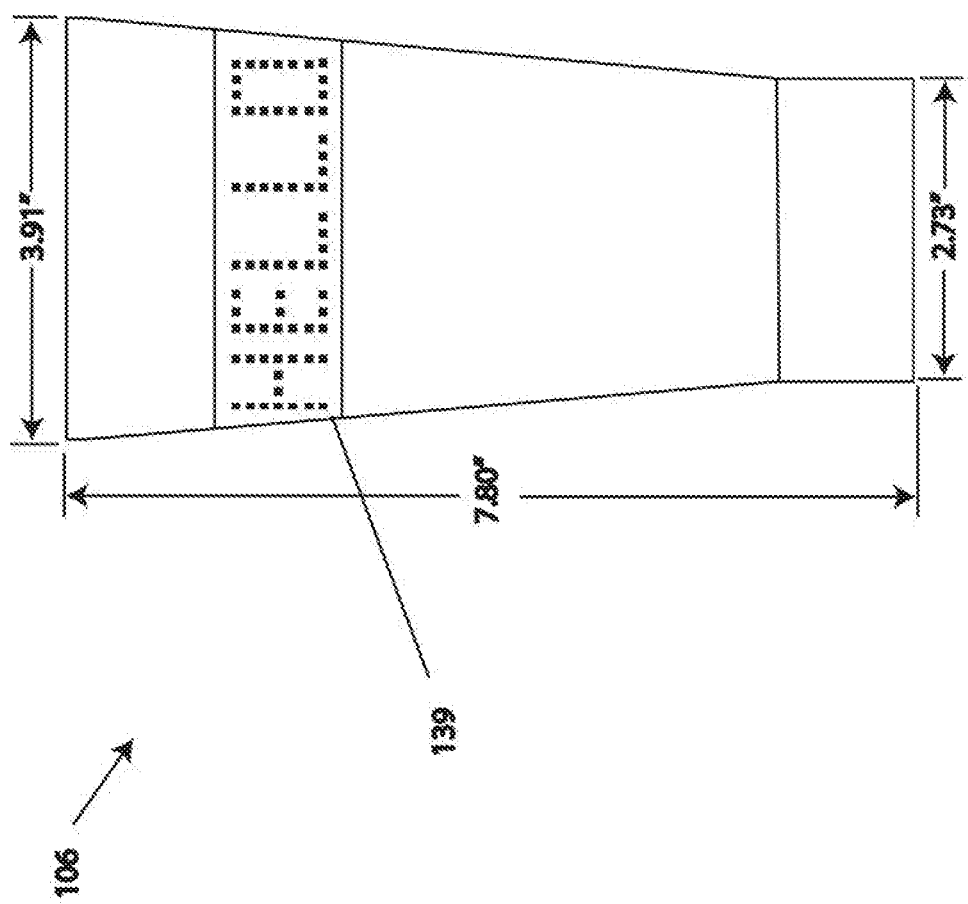
FIG. 4 shows an embodiment of a beverage container with the display.
Figure 5:
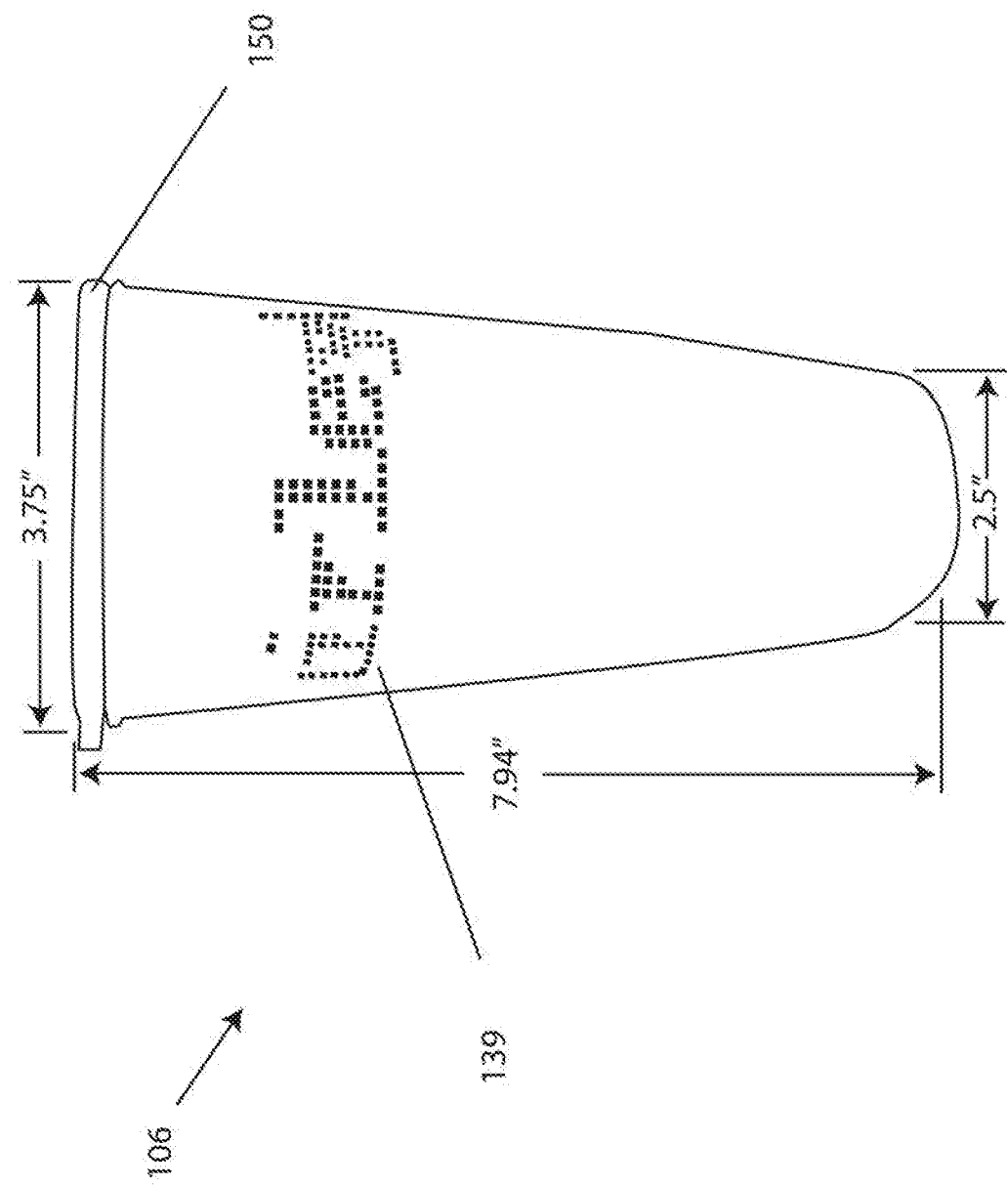
FIG. 5 shows another embodiment of a beverage container with the display.
Figure 6:
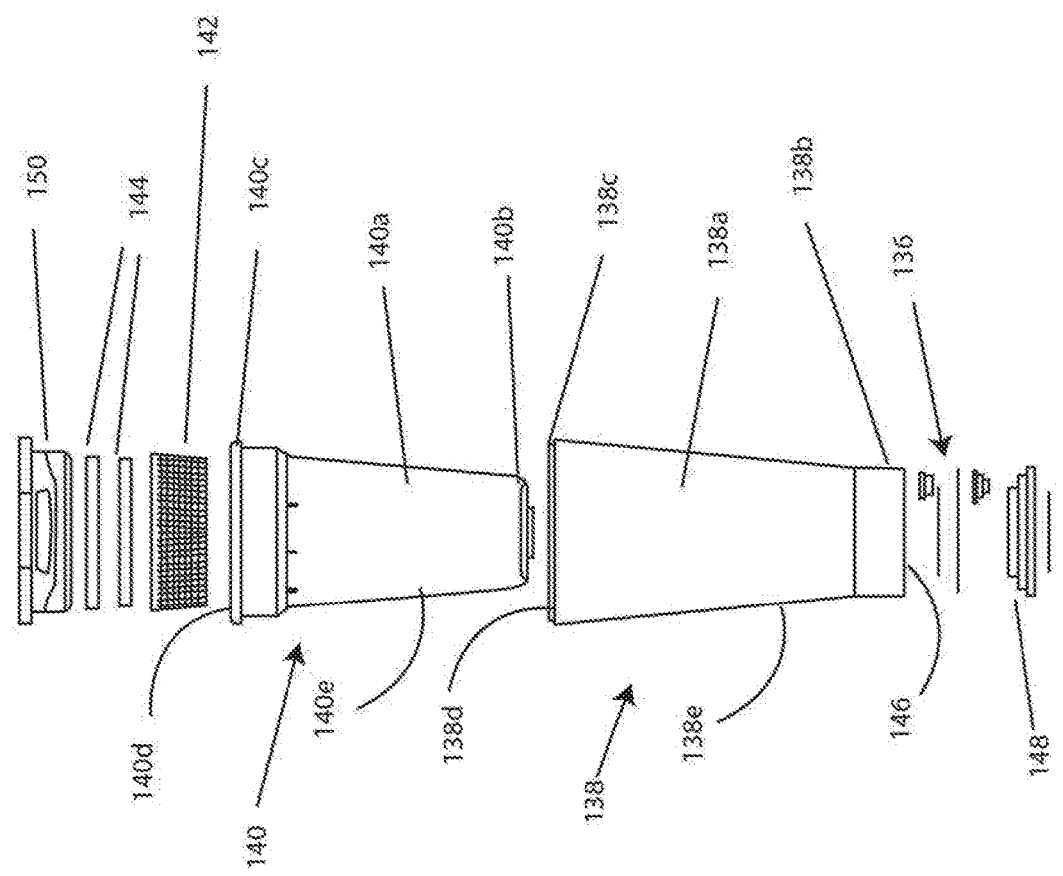
FIG. 6 shows an exploded view of an embodiment of a beverage container with various components of the beverage container in juxtaposition with each other.
Figure 7:
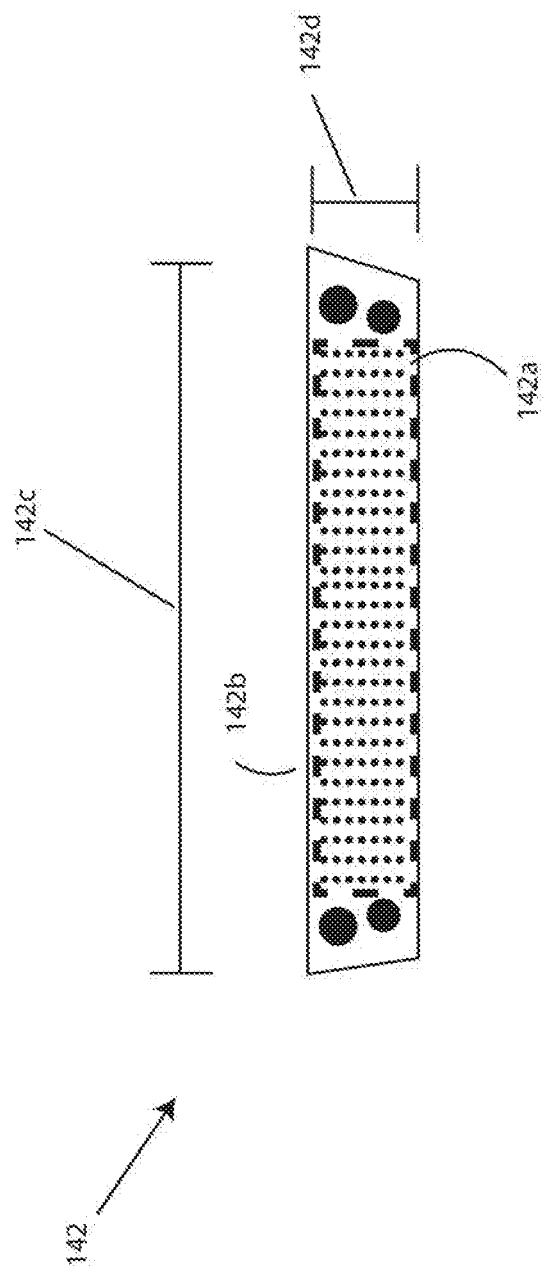
FIG. 7 shows an embodiment of the display configured as a banner.
Figure 8:
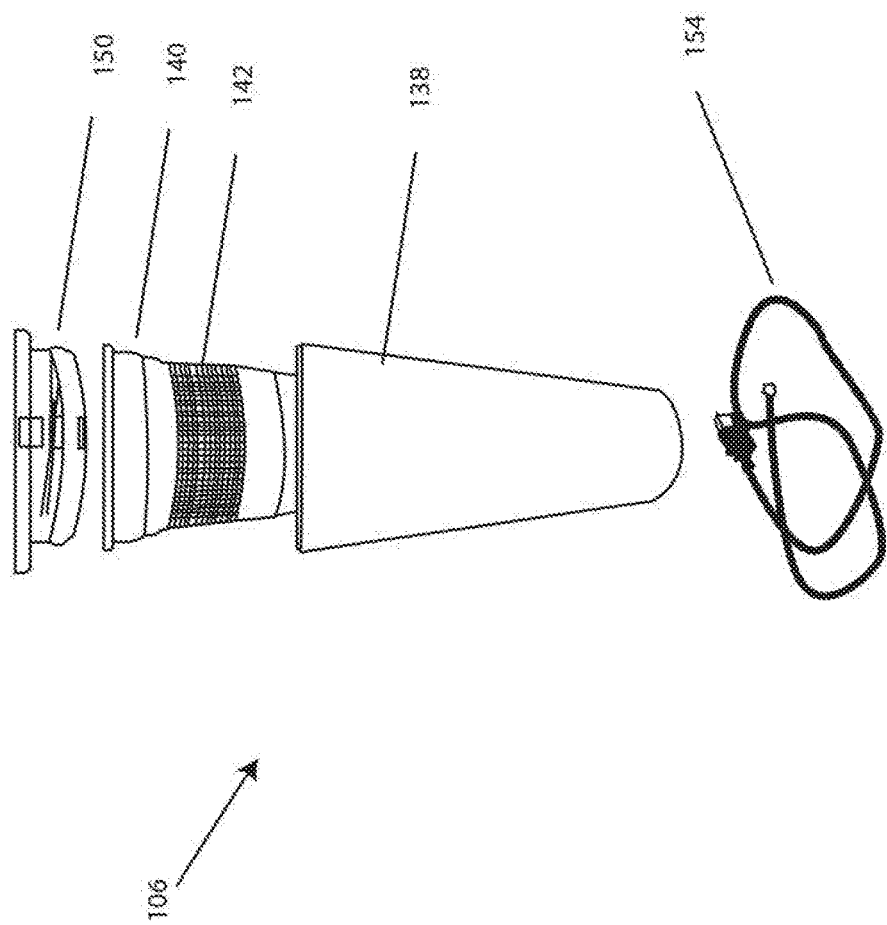
FIG. 8 shows another exploded view of an embodiment of a beverage container with various components of the beverage container in juxtaposition with each other.
Figure 9B:
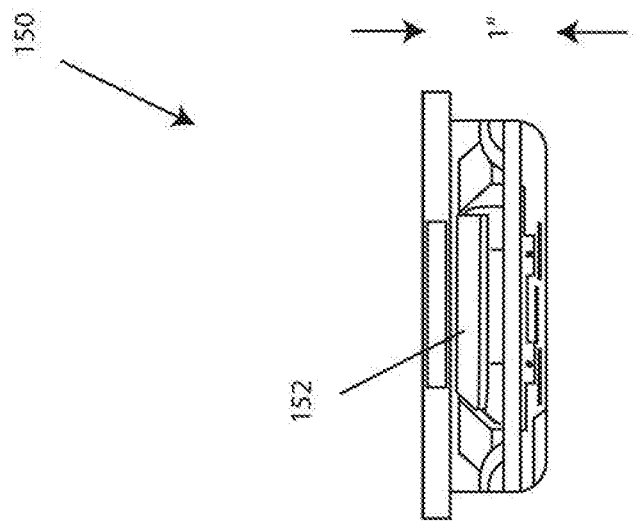
FIGS. 9A-9B show an embodiment of a lid that can be used with an embodiment of a beverage container.
Figure 9A:
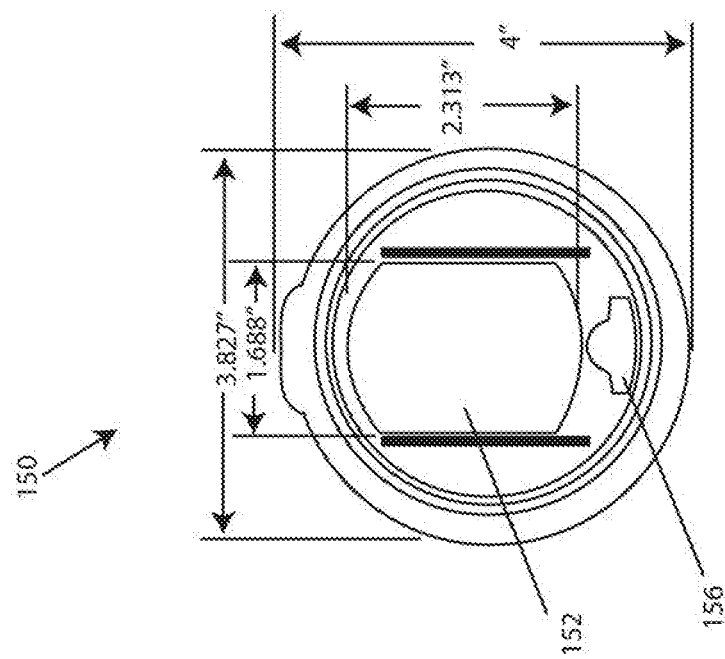
Figure 10:
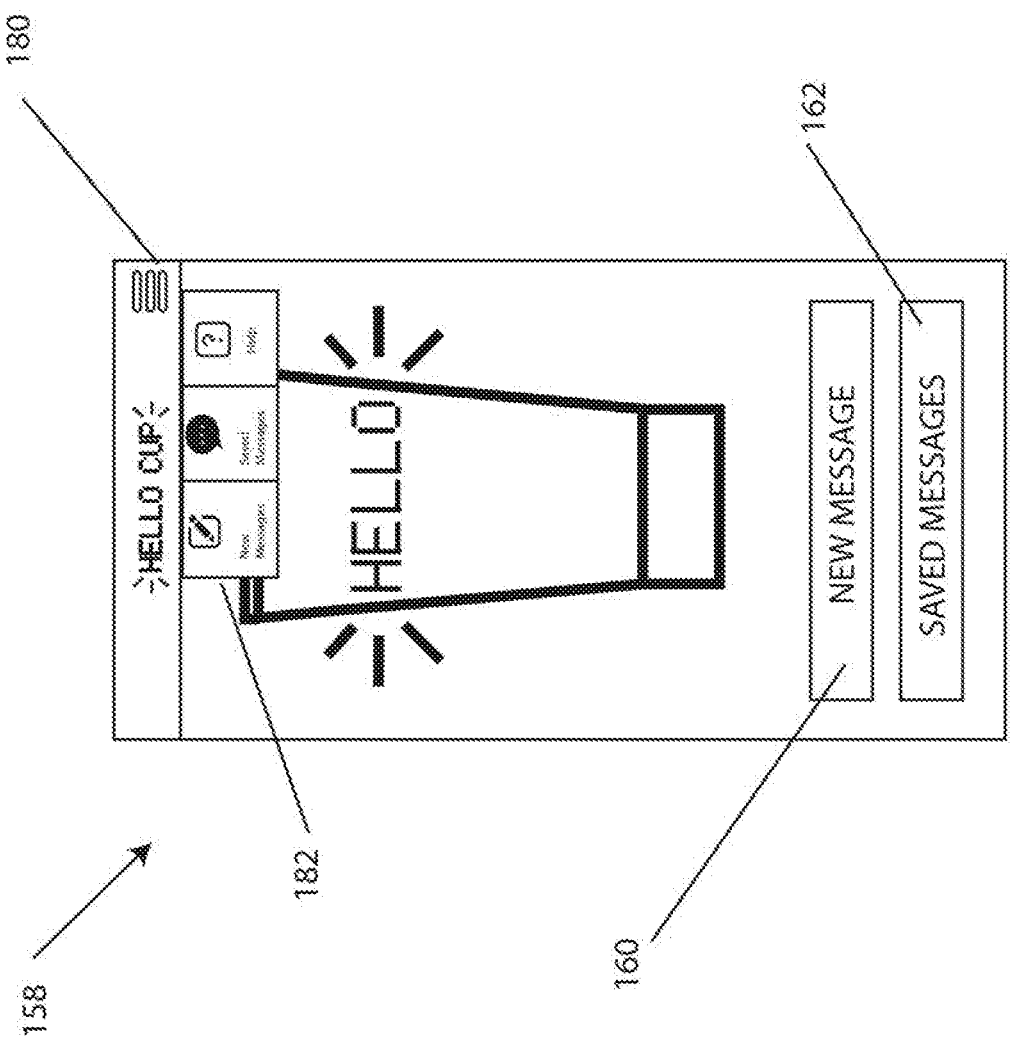
FIG. 10 shows an exemplary home screen that can be used with an embodiment of the system.
Figure 11:
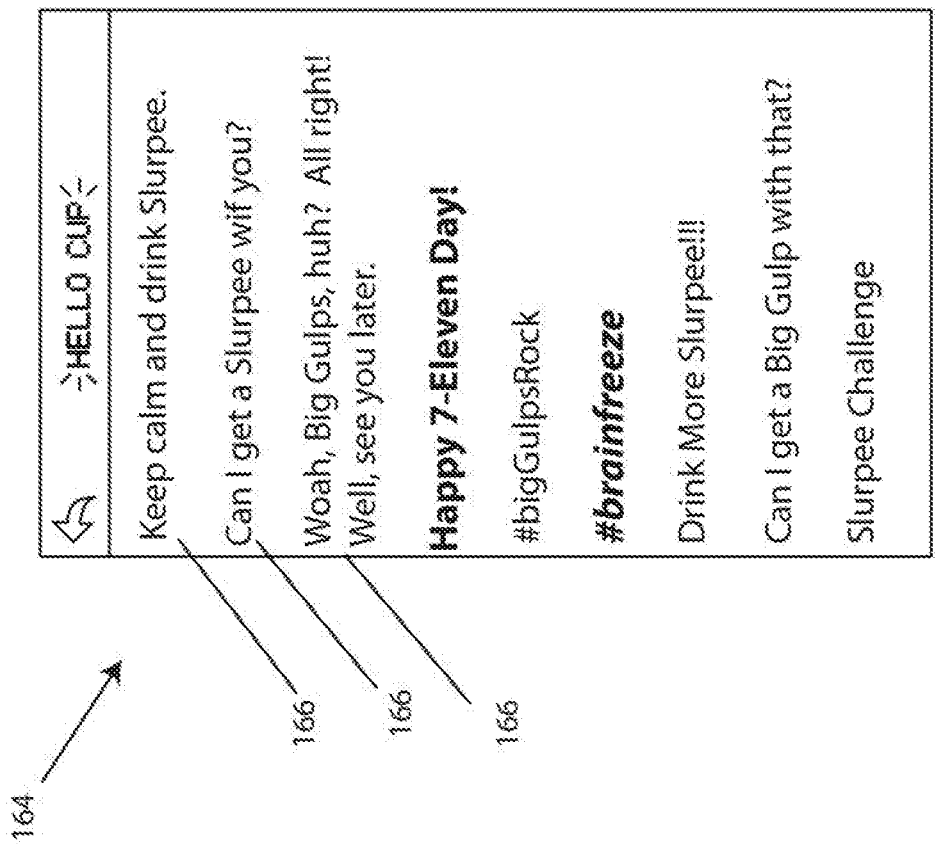
FIG. 11 shows an exemplary saved message screen that can be used with an embodiment of the system.
Figure 12:
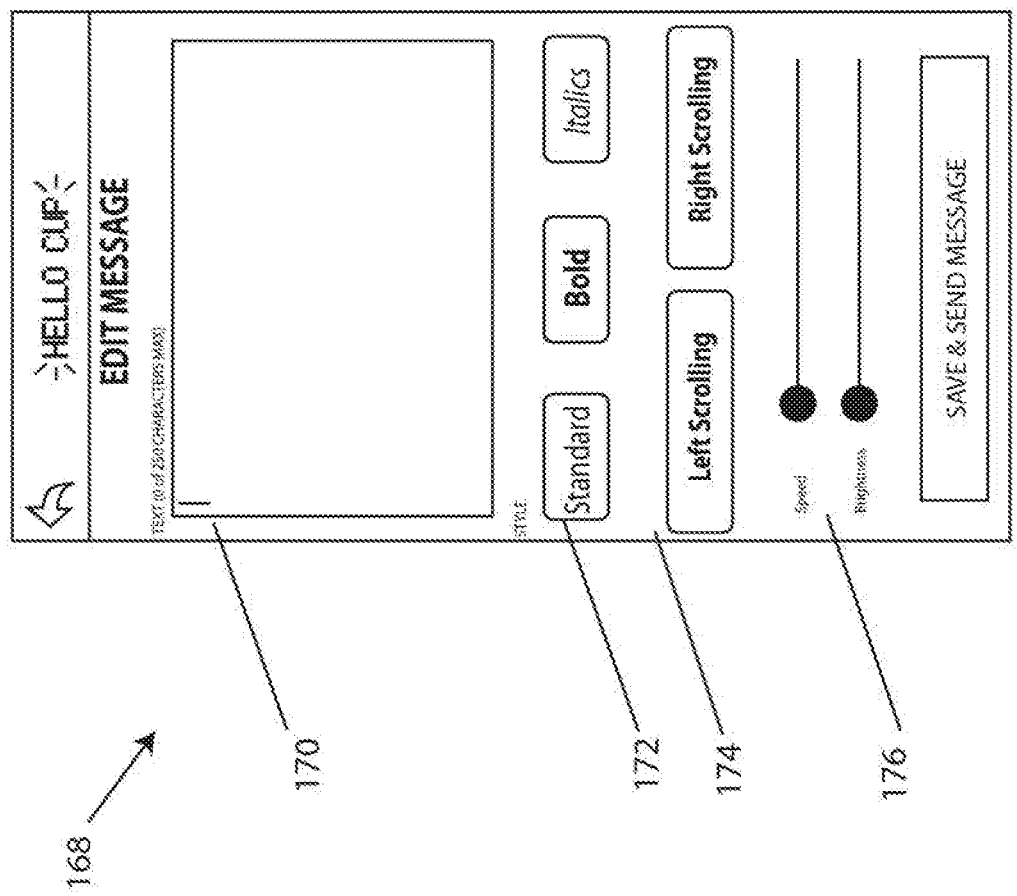
FIG. 12 shows an exemplary message edit screen that can be used with an embodiment of the system.
Figure 13:
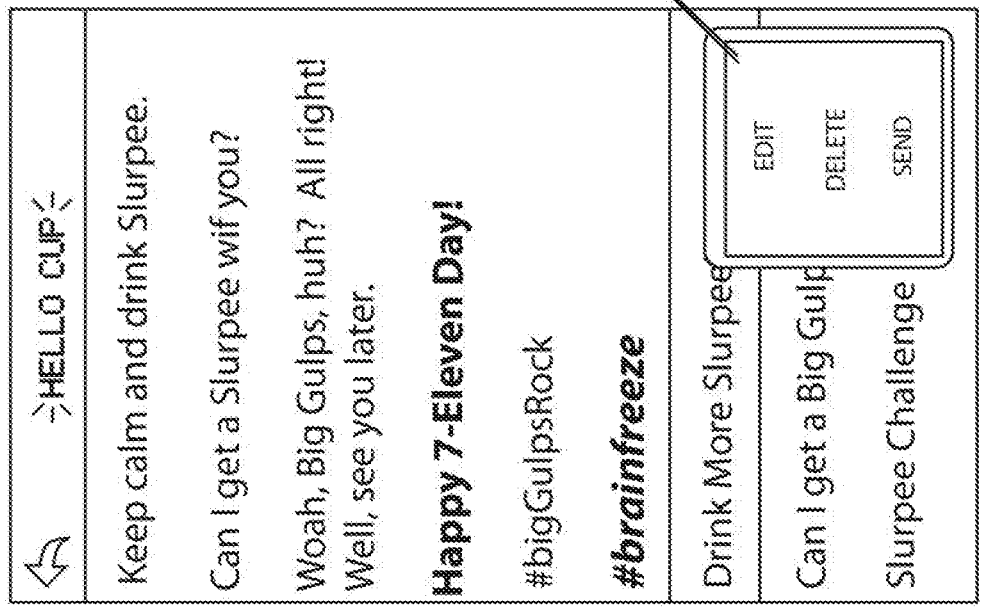
FIG. 13 shows an exemplary saved message screen with a pop-up window for editing saved messages.

Referring to FIGS. 2-3, embodiments can include a display 102. This can include an electronic visual display 102. For example, the display 102 can be configured as a light emitting diode (LED) display, a liquid crystal display (LCD), thin-film transistor display, etc. The display 102 can be a screen 120 including a plurality of pixels 122. The screen 120 can be flexible. For example, the screen 120 can include a flexible substrate 124 (e.g., plastic) having a plurality of pixels 122 defined therein or thereon. In at least one embodiment, the screen 120 can be a flexible substrate 124 having a plurality of LEDs 126 defined therein or thereon. Each LED 126 can include a p-type layer 130, an emissive layer 132, and an n-type layer 134 formed in or on the substrate 124. Each LED 126 can form a pixel 122. In some embodiments, multiple LEDs 126 can form a pixel 122. The plurality of pixels 122 can be in a form of an array 128. The processor of the display 102 can be programmed to cause certain LEDs 126 within the pixel array 128 to emit light. For example, the display 102 can include a power source 136 (e.g., a battery and/or a charging port) and circuitry to facilitate selective transfer of electrical power from the power source 136 to any one or combination of LEDs 126 to cause any one or combination of LEDs 126 to emit light. The selected LEDs 126 emitting light can generate a message.

The display 102 can be in connection with the first computer device 108*a* via the computer network 104. The first computer device 108*a* can be used to transmit instructions, in the form of program logic, to the display 102. The instructions can cause the processor of the display 102 to selectively transmit electrical power from the power source 136 to any one of combination of LEDs 126 to execute a first message scheme and/or generate a first message. The display 102 can be in connection with the second computer device 108*b* via the computer network 104. The second computer device 108*b* can be used to transmit instructions, in the form of program logic, to the display 102. The instructions can cause the processor of the display 102 to selectively transmit electrical power from the power source 136 to any one of combination of LEDs 126 to execute a second message scheme and/or generate a second message. Various pixel 122 emission schemes can be generated, which can include a continuous emission scheme, a periodic emission scheme, a blinking emission scheme, a change in color emission scheme, etc. These can be done to cause the message (e.g., the first message or the second message), or any part of the message, to have a graphic or visual effect (e.g., to blink, change color, appear to be animated, etc.). The message displayed can have any combination of textual, graphic, or other electronic visual effects.

It is contemplated for the display 102 to be attached to, attachable to, placed inside, or otherwise associated with an apparatus. The apparatus can be a consumer product (e.g., a toy), an article of clothing (a shirt, a hat, etc.), a container (e.g., beverage container, food container, etc.), etc. It is further contemplated for the apparatus to be sold by a merchant and purchased by a buyer. Exemplary embodiments show the display 102 associated with a beverage container 106, but it is understood that the display 102 can be associated with any type of apparatus.

The first user can be a merchant selling the beverage container 106. The second user can be a buyer of the beverage container 106. It is contemplated for the merchant to sell several beverage containers 106, and thus there can be a plurality of second users (with a plurality of second computer devices 108*b* generating a plurality of second messages). It is further contemplated for there to be different merchants selling the same type of beverage container 106, and thus there can be a plurality of first users (with a plurality of first computer devices 108*a* generating a plurality of first messages). Each first computer device 108*a* and second computer device 108*b* can be configured to download application software. The application software can allow users, via user interfaces, to cause the display 102 to execute a message scheme and/or generate a message. For example, the application software can generate a user interface on the first computer device 108*a* to allow a first user to create a first message and/or a first message scheme. The application software can generate a user interface on the second computer device 108*b* to allow a second user to create a second message and/or a second message scheme.

The system 100 can be set up to provide a hierarchical level of control. For example, the computer server 116 can include program logic to allow the first user, via the computer device 108*a*, to display the first message at any time. Various schemes can be utilized by the first user to allow the second user to display the second massage at the discretion of the first user. This can include preventing the second message from being displayed, or prevent certain second messages from being displayed. This can also include causing the display 102 to execute the second message scheme as a function of the first message scheme. In other words, the execution of the second message scheme can be dependent on the first message scheme.

As a non-limiting example, the first message scheme can be set to allow the first user to generate a first message. The first message can be an advertisement for a product unrelated to the beverage container 106 or the system 100, an advertisement for the beverage container 106 or the system 100, a promotion for a product or a service, some other message, or a combination thereof. The first message scheme can generate a first message continuously, cause the first message to blink, cause the first message to change color, alternate between various first messages, cause the first message to scroll across the display 102, change the speed at which the first message scrolls across the display 102, change the brightness of the text of the first message, cause the text of the first message to change font or style, etc. In some embodiments, the system 100 can be configured to cause the display 102 to generate the first message until the first user allows the first message scheme to be interrupted. In some embodiments, the system 100 can be configured to cause the display 102 to generate the first message until a second user generates a second message scheme for that display 102. For example, a second user can purchase the beverage container 106 containing the display 102 and set up a second message scheme via the second computer device 108b.

The second message scheme can be set to allow the second user to generate a second message. The second message can be a personalized message created by the second user. The second message scheme can generate a second message continuously, cause the second message to blink, cause the second message to change color, alternate between various second messages, cause the second message to scroll across the display 102, change the speed at which the second message scrolls across the display 102, change the brightness of the text of the second message, cause the text of the second message to change font or style, etc.

As noted above, the system 100 can be set up to provide a hierarchical level of control. For example, the system 100 can be configured to allow the first user to always be able to generate a first message. This can include interrupting the second message with the first message. For example, the first message scheme can be configured such that a first message is generated on the display 102 by temporarily preventing the second message from being displayed. The first message scheme can interrupt the second message on a periodic basis, at predetermined times, when the display 102 is at a certain location (GPS location detection and the ability to generate first messages based on location will be discussed later), etc. This can also include displaying the first message concurrently with the second message. For example, the first message scheme can be configured such that a first message is generated on the display 102 along with the second message. The first message scheme can display the first message concurrently with the second message on a periodic basis, at predetermined times, when the display 102 is at a certain location, etc.

In some embodiments, the first message scheme can include preventing the second message from being displayed at all. For example, the computer server 116 can include program logic to analyze the second message. If the second scheme contains a second message that is offensive, obscene, or otherwise unacceptable then that second message can be prevented from being displayed or second message scheme can be prevented from being executed by the display 102. In some embodiments, the unacceptable second message can be replaced with a first message. The first message may include a notification that the second message is unacceptable and will not be displayed.

In some embodiments, the system 100 can be configured to carry out the first message scheme and display the first message until the second message scheme has been created or until the second message scheme causes the display 102 to generate the second message. For example, even after the buyer has the beverage container 106 with the display 102, the first message can be displayed until the second message scheme is created by the second user and executed by the display 102. As another example, even after the buyer has the beverage container 106 with the display 102 and the second message scheme is created by the second user and being executed by the display 10, the first message can be displayed when there is a period of time when no second message is being displayed.

In some embodiments, the display 102 can include a global positioning system (GPS) unit. The GPS unit can determine and transmit the geographic location of the display 102 at any given time. This can include transmitting the geographic location to any component of the system 100. The geographic location data can be transmitted on a continuous basis, a periodic basis, or when acquisitioned by the system 100. The first message scheme can be configured such that a first message is generated based on the geographic location of the display 102. This can include generating the first message to interrupt the second message or to be displayed concurrently with the second message. This can include determining the content of the first message and/or determining when the first message is displayed based on the geographic location of the display 102. For example, if the display 102 is located within a predetermined distance of location X (e.g., a convenience store) then the first message can be caused to interrupt the second message or be caused to display concurrently with the second message. This can include displaying the first message the entire time the display 102 is located within a predetermined distance of location X or for a predetermined period of time the display 102 is located within the predetermined distance of location X. While the display 102 is located within the predetermined distance of location X, the first message can be tailored to generate message (e.g., an advertisement) related to location X. When the display 102 is located outside the predetermined distance of location X, the second message scheme may continue un-interrupted or without the first message being displayed concurrently therewith, unless the first message scheme causes the display 102 to display another first message based on another condition.

In some embodiments, the display 102 can include an internal clock. The first message scheme can be configured such that a first message is generated based on the time of day for the display 102. This can include generating the first message to interrupt the second message or to be displayed concurrently with the second message. This can include determining the content of the first message and/or determining when the first message is displayed based on the time of day. For example, if the internal clock of the display 102 indicates that it is a certain time, or within a certain time range, of the day then the first message can be caused to interrupt the second message or be caused to display concurrently with the second message. This can include displaying the first message the entire time the display 102 is within the certain time range or for a predetermined period of time within that time frame. When the certain time range is occurring, the first message can be tailored to generate the first message (e.g., an advertisement) related to that time frame. When the certain time range has elapsed, the second message scheme may continue un-interrupted or without the first message being displayed concurrently therewith, unless the first message scheme causes the display 102 to display another first message based on another condition.

Some embodiments can include the use of geographic location and time to determine the content of the first message and when the first message is displayed. For example, if the display 102 is located within the predetermined distance of location X and it is within a time range X (e.g., the morning), then then the first message can be caused to interrupt the second message or be caused to display concurrently with the second message based on location X and time X. For example, the first message can be an advertisement for coffee sold by convenience store X. If the display 102 is located within the predetermined distance of location X and it is within a time range Y (e.g., the evening), then then the first message can be caused to interrupt the second message or be caused to display concurrently with the second message based on location X and time Y. For example, the second message can be an advertisement for a lottery ticket sold by convenience store X.

Referring to FIGS. 4-9, in some embodiments, the display 102 may be attached to, attachable to, or otherwise associate with, a beverage container 106. The beverage container 106 can include a shell 138. The shell 138 can be configured to receive and retain a liner 140. For example, the shell 138 can be a rigid structure having a shell inner surface 138*d*, a shell outer surface 138*e*, and a shell sidewall 138*a* conjoined with a shell bottom 138*b* and a shell open top 138*c*, forming a cavity within a volume of space between the shell inner surfaces 138*d* of the shell sidewall 138*a*, the shell bottom 138*b*, and the shell open top 138*c*. The liner 140 can be a rigid structure having a liner inner surface 140*d*, a liner outer surface 140*e*, and liner sidewall 140*a* conjoined with a liner bottom 140*b* and a liner open top 140*c*, forming a cavity within a volume of space between the liner inner surfaces 140*d* of the liner sidewall 140*a*, the liner bottom 140*b*, and the liner open top 140*c*. The liner 140 can be configured to slidably insert into the shell 138. For example, the liner 140 can slidably insert into the cavity of the shell 138. The liner cavity can be used to contain food, liquid, or some other material.

The shell 138 can be fabricated from plastic, glass, metal, ceramic etc. At least a portion of the shell 138 can be transparent, translucent, or opaque to frequencies of light within the visible spectrum. At least a portion of the shell 138 can provide a window 139. The window portion 139 of the shell 138 can be transparent or translucent to frequencies of light within the visible spectrum. In some embodiments, the entire shell sidewall 138*a* is transparent or translucent to frequencies of light within the visible spectrum. Thus, the entire shell sidewall 138*a* can be the window 139. In some embodiments, the entire shell 138 is transparent or translucent to frequencies of light within the visible spectrum. Thus, the entire shell 138 can be the window 139.

The liner 140 can be fabricated from plastic, glass, metal, ceramic, etc. At least a portion of the liner 140 can be transparent, translucent, or opaque to frequencies of light within the visible spectrum. In some embodiments, the entire liner 140 is opaque to frequencies of light within the visible spectrum.

The display 102 can be structured as a banner 142. The banner 142 can be a strip flexible material (e.g., polyester, polypropylene, nylon, etc.) that has the screen 120 attached to a surface thereof. The banner 142 can have a banner first surface 142*a*, a banner second surface 142*b*, a banner length 142*c*, and a banner height 142*d*. The screen 120 can be attached to the banner first surface 142*a*. The banner second surface 142*b* can be configured to rest against or be attached to the liner outer surface 140*e*. After positioned against the liner outer surface 140*e* and the liner 140 is placed within the cavity of the shell 138, the banner first surface 142*a* can lie adjacent the shell inner surface 138*d*. The banner second surface 142*b* can have adhesive applied to a portion thereof to allow the banner 142 to adhere to the liner outer surface 140*e*. In addition, or in the alternative, at least one strap 144 can be used to hold the banner 142 in place against the liner 140. The strap 144 can be an elastic band, for example, that is secured about the banner 142 after the banner 142 is placed against the liner 140. In some embodiments, the banner length 142*c* can be such that the banner 142 circumscribes an entire liner outer surface 140*e* of at least a portion of the liner 140.

It is contemplated for the banner 142 to be placed on the liner 140 such that the banner first surface 142*a* is in viewing sight (viewed from a user looking at the beverage container 106) through the window 139, if the shell 138 is provided with a window 139. In at least one embodiment, the entire sidewall 138*a* of the shell 138 is translucent so placement of the banner 142 at any location of the liner sidewall 140*a* will facilitate the banner first surface 142*a* being in viewing sight. In some embodiments, the liner 140 can be a material having a dark color, or otherwise absorb much if not all frequencies of light within the visible spectrum. The shell 138, or at least the window 139 of the shell 138, can be translucent to frequencies of light expected to be emitted from the LEDs 126 of the display 102 but otherwise opaque to other frequencies of light, which may include frequencies of light within the visible spectrum. For example, liner 140 can be fabricated from black plastic and the shell 138 can be fabricated from tinted glass so that when the display 102 is not producing any type of message, a user cannot discern that the beverage container 106 has a display 102 located between the shell 138 and the liner 140.

The shell 138 can also be configured to receive and retain the power source 136. For example, the shell bottom 138*b* can be configured as power source compartment 146. In at least one embodiment, the shell bottom 138*b* can have a bottom door 148 that is removable or hingedly attached to selectively grant access to the power source compartment 146. The power source compartment 146 can house a battery, which can be a replaceable battery and/or a rechargeable battery. In some embodiments, the power source compartment 146 can include a charging port. For example, the charging port can be configured to receive a USB cable 154 to charge the battery and/or provide electrical power to the display 102. Electrical leads and electrical connectors can be used to provide electrical connections between the display 102 and the power source 136. In some embodiments, the beverage container 106 can have an on/off switch for selectively allowing power transfer from the power source 136 to the display 102.

Some embodiments of the beverage container 106 include a lid 150. The lid 150 can be configured to secure to the shell top 138*c* and/or liner top 140*c* via a snap fit, threaded engagement, or some other type of engagement. In some embodiments, the lid 150 can include a lid opening 156 with a slider 152 to facilitate selective access to the contents of the beverage container 106 via the lid opening 156.

Referring to FIGS. 10-13, as noted above, the system 100 can be configured to generate a user interface facilitating at least one user to issue commands, access data, and/or transmit data to and from a component of the system 100. This can allow a user, via the first computer device 108*a* and/or second computer device 108*b* to set up a first message scheme and/or a second message scheme. Upon accessing the application software, a home screen 158 can be displayed.

The home screen 158 can be programmed to display a menu bar 180. The menu bar 180 can display screen icons 182 when actuated. The home screen 158 can also be programmed to display a new message icon 160 and a saved message icon 162. The system 100 can be programmed such that selecting the saved message icon 162 can generate a saved message screen 164. The saved message screen 164 can be programmed to display a list of saved messages 166 from which a user can choose to set as the message or part of the message scheme. The system 100 can be programmed such that selecting the new message icon 160 can generate a message edit screen 168. The message edit screen 168 can be programmed to display a text box 170, a style box 172, an animation box 174, and/or a speed box 176. The text box 170 can allow a user to enter a message to be used as part of the message scheme and/or saved in the saved messages 166. The style box 172 can include font functions (e.g., change color, brightness, make the text bold, make the text italics, etc.) to personalize the text of the message. The animation box 174 can include animation functions (e.g., cause the text to blink, cause the text to scroll across the display 102, etc.) to allow a user to further personalize the message. The speed box 176 can include a slide bar allowing a user to set the speed with which the animation will occur (e.g., change the speed at which the text scrolls across the display 102).

In some embodiments, a user can edit a saved message 166 in a similar fashion as described above. Editing a saved message 166 can occur via a pop-up window 178 being displayed when a saved message 166 is actuated. Upon actuating the "edit" icon of the pop-up window 178, the system 100 can navigate to the message edit screen 168. A user can also delete a saved massage by actuating the "delete" icon of the pop-up window 178. Actuating the "send" icon of the pop-up window 178 will transmit that message as being used as the message or part of the message scheme.

In a non-limiting, exemplary embodiment, the system 100 can be configured so that the first computer device 108a is a server operated by a first user (e.g., merchant of the system 100) and the second computer device 108b is a smartphone operated by a second user (e.g., purchaser of the system 100). The second user can purchase an embodiment of the beverage container 106 having a display 102 built in. As noted herein, application software can be used to display information and grant access to data related to certain aspects and functionalities of the system 100. The application software can be in the form of an app. that is downloaded by the second user and installed on the smartphone of the second user. It is contemplated for any individual to be able to download the app., regardless of them buying the beverage container 106. Thus, there can be several second users for the same beverage container 106. The communication network 110 can be configured such that the second user (or the second computer device 108b) has to be within a predetermined distance (e.g., 5, feet, 10 feet, 15 feet, etc.) of the beverage container 106 or the display 102 to allow the second computer device 108b to be able to communicate with the display 102. When the second user (or the second computer device 108b) is within the predetermined distance, the second computer device 108b can establish connectivity with the display 102 and allow the second user, via the user interface generated by the app., to generate a second message scheme or second message. As noted herein, there can be a plurality of second users for a single display 102. For instance, each of a first-second user (a purchaser of a first beverage container 106 with a first display 102), a second-second user (a purchaser of a second beverage container 106 with a second display 102), and a third-second user (one who does not purchase any beverage container 106) can download the app. on their respective second computer devices 108b. Any of the first, second, and/or third second users (or their respective second computer devices 108b) can establish connectivity (e.g., via a mesh network topology for example) with any of the first and/or second displays 102 when they are within the predetermined distance. Thus, any of the first, second, and/or third users can generate a second message scheme or second message on the first display 102. Similarly, any of the first, second, and/or third users can generate a second message scheme or second message on the second display 102.

As another non-limiting, exemplary embodiment, the system 100 can be configured so that a purchaser of the beverage container 106 with the display 102 can or has to register the beverage container 106 via the app. This can be done to only allow a second user who has registered the beverage container 106 to generate second message schemes or second messages for that beverage container 106. For instance, once registered, only the second computer device 108b that was used to register the beverage container 106 can subsequently establish connectivity with the display 102 so as to facilitate generating second message schemes or second messages for that beverage container 106. In some embodiments, the second user who has registered the beverage container 106 can allow other second users (e.g., other second computer devices 108b) to establish connectivity with the display 102 so as to allow them to also generate second message schemes or second messages for that beverage container 106. For instance, a first-second user can purchase the beverage container 106 with the display 102 and register that beverage container 106 so that only the first-second user's second computer device 108b can establish connectivity with the display 102 and generate second message schemes or second messages for that beverage container 106. A second-second user can download the app. on the second-second user's compute device 108b but cannot establish connectivity with the first-second user's display 102 unless the first-second user allows for it. When the second-second user's computer device 108b is within the predetermined distance of the first-second user's display 102, the user interface of the first-second user's computer device 108b can generate an indictor to that effect. The first-second user can then have an option to allow the second-second user's computer device 108b to establish connectivity with the first-second user's display 102. The first-second user's user interface can also have an option to deny the second-second user's computer device 108b ability to establish connectivity with the first-second user's display 102. Thus, the user interface can have a toggle switch to allow or deny other second user computer devices 108b to establish connectivity with the first-second user's display 102. The embodiments disclosed in this paragraph can be achieved via a mesh network communication topology, for example.

It should be understood that modifications to the embodiments disclosed herein can be made to meet a particular set of design criteria. For instance, the number of or configuration of beverage containers 106, shells 138, liners 140, computer devices 108, displays 102, and/or other components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. Therefore, it is the intent to cover all such modifications and alternative embodiments as may come within the true scope of this invention, which is to be given the full breadth thereof. Additionally, the disclosure of a range of values is a disclosure of every numerical value within that range, including the end points.

Therefore, while certain exemplary embodiments of apparatuses and methods of making and using the same have been discussed and illustrated herein, it is to be distinctly understood that the invention is not limited thereto but may be otherwise variously embodied and practiced within the scope of the following claims.

We claim:

1. A container, comprising:
   a shell comprising a shell inner surface, a shell outer surface, and a shell sidewall conjoined with a shell bottom and a shell open top, the shell forming a shell cavity;
   a liner comprising a liner inner surface, a liner outer surface, and liner sidewall conjoined with a liner bottom and a liner open top, the liner forming a liner cavity;
   a display comprising a display processor, a display memory, a display transceiver, and a screen, the screen comprising a substrate with a plurality of pixels formed therein or thereon; and
   a power source configured to provide electrical power to the display;
   wherein:
      the display is configured to attach to a portion of the liner;
      the liner is configured to insert into the shell cavity;
      the power source is housed within a power source compartment located within the shell bottom;
      the display is configured to transmit and receive data from at least one computer device, the data including instructions to be processed by the display processor for controlling the transmission of electrical power from the power source to the plurality of pixels to generate a message;
      at least a portion of the shell is translucent to frequencies of light being emitted from the display; and
      at least a portion of the liner is opaque to frequencies of light within the visible spectrum.

2. The container recited in claim 1, wherein the display further comprises a GPS unit.

3. The container recited in claim 1, wherein the display further comprises an internal clock.

4. The container recited in claim 1, wherein the substrate is a flexible substrate.

5. The container recited in claim 1, wherein the substrate comprises a plurality of LEDs formed therein or thereon, each individual LED forming an individual pixel of the plurality of pixels.

6. The container recited in claim 1, wherein the substrate comprises a plurality of LEDs formed therein or thereon, wherein multiple LEDs form an individual pixel of the plurality of pixels.

7. The container recited in claim 1, wherein the plurality of pixels is arranged in a pixel array.

8. The container recited in claim 1, wherein the shell is translucent to frequencies of light emitted from the plurality of pixels but otherwise opaque to other frequencies of light.

9. An electronic messaging system, comprising:
   the container of claim 1, wherein the at least one computer device comprises a first computer device and a second computer device;
   wherein:
      the first computer device comprises a first computer device processor, a first computer device memory, and a first computer device transceiver;
      the second computer device comprises a second computer device processor, a second computer device memory, and a second computer device transceiver;
      the display, the first computer device, and the second computer device are in communication with each other via a communication network;
      the first computer device transmits a first messaging scheme to be carried out by the display processor for causing the plurality of pixels to generate a first message; and
      the second computer device transmits a second messaging scheme to be carried out by the display processor for causing the plurality of pixels to generate a second message.

10. The electronic messaging system recited in claim 9, comprising a plurality of containers, each display of the plurality of containers in communication with the first computer device and the second computer device via the communication network.

11. The electronic messaging system recited in claim 9, comprising a plurality of first computer devices, each first computer device of the plurality of first computer devices in communication with the display and the second computer device via the communication network.

12. The electronic messaging system recited in claim 9, comprising a plurality of second computer devices, each second computer device of the plurality of second computer devices in communication with the display and the first computer device via the communication network.

13. The electronic messaging system recited in claim 9, comprising a plurality of containers, a plurality of first computer devices, and a plurality of second computer devices, each display of the plurality of containers, first computer device of the plurality of first computer devices, and second computer device of the plurality of second computer devices in communication with each other via the communication network.

14. The electronic messaging system recited in claim 9, wherein at least one of the first computer device and the second computer device is a smartphone.

15. A method of providing an electronic messaging system, comprising:
   attaching a display to a beverage container;
   transmitting a first messaging scheme via a first computer device to the display, causing the display to execute the first messaging scheme to generate a first message; and
   transmitting a second messaging scheme via a second computer device to the display, causing the display to execute the second messaging scheme to generate a second message, the execution of the second messaging scheme being at least partially dependent on the first messaging scheme;
   registering the beverage container via a first-second computer device, wherein:
      the second messaging scheme comprises a plurality of second messaging schemes, the plurality of second messaging schemes comprising a first-second messaging scheme and a second-second messaging scheme;
      the first-second messaging scheme is generated by the first-second computer device and transmitted to the display to generate the second message; and
      the second-second messaging scheme is generated by a second-second computer device and transmitted to the display to change the second message only when the first-second computer device permits connectivity between the second-second computer device and the display.

16. The method recited in claim 15, wherein executing the second messaging scheme comprises the first message interrupting the second message.

17. The method recited in claim 15, wherein executing the second messaging scheme comprises the first message being displayed concurrently with the second message.

18. The method recited in claim 15, wherein executing the second messaging scheme comprises preventing the second message from being displayed.

19. The method recited in claim 15, wherein executing the second messaging scheme comprises displaying the first message based on at least one of geographic location of the display and time of day.

* * * * *

UNITED STATES PATENT AND TRADEMARK OFFICE
CERTIFICATE OF CORRECTION

PATENT NO. : 10,613,816 B2  
APPLICATION NO. : 16/233754  
DATED : April 7, 2020  
INVENTOR(S) : Brad M. Bielawski et al.

Page 1 of 1

It is certified that error appears in the above-identified patent and that said Letters Patent is hereby corrected as shown below:

On the Title Page

At item (72) Inventors: Please change "Jospeh M. Schwind" to "Joseph M. Schwind".

Signed and Sealed this
Fifteenth Day of September, 2020

Andrei Iancu
*Director of the United States Patent and Trademark Office*